US011399530B2

(12) United States Patent
Rocha et al.

(10) Patent No.: US 11,399,530 B2
(45) Date of Patent: Aug. 2, 2022

(54) PLUG-IN INSECT TRAP

(71) Applicant: Dynamic Solutions Worldwide, LLC, Milwaukee, WI (US)

(72) Inventors: Juan Rocha, Lake Forest, IL (US); Robert Seaton, Verona, WI (US)

(73) Assignee: Dynamic Solutions Worldwide, LLC, Milwaukee, WI (US)

( * ) Notice: Subject to any disclaimer, the term of this patent is extended or adjusted under 35 U.S.C. 154(b) by 546 days.

(21) Appl. No.: 15/673,831

(22) Filed: Aug. 10, 2017

(65) Prior Publication Data

US 2019/0045771 A1  Feb. 14, 2019

(51) Int. Cl.
 *A01M 1/14* (2006.01)
 *A01M 1/02* (2006.01)

(52) U.S. Cl.
 CPC .............. *A01M 1/145* (2013.01); *A01M 1/02* (2013.01)

(58) Field of Classification Search
 CPC .......... A01M 1/145; A01M 1/02; A01M 1/00; A01M 1/04; A01M 1/10; A01M 1/103; A01M 1/106; A01M 1/14
 See application file for complete search history.

(56) References Cited

U.S. PATENT DOCUMENTS

| | | | | |
|---|---|---|---|---|
| 1,461,169 A | * | 7/1923 | Wilson | A01M 1/145 43/113 |
| 4,951,414 A | | 8/1990 | Mewissen | |
| RE34,402 E | * | 10/1993 | Williams | A01M 1/145 43/113 |
| 5,556,192 A | * | 9/1996 | Wang | F21S 8/035 428/905 |
| 5,974,727 A | | 11/1999 | Gilbert | |
| 6,478,440 B1 | * | 11/2002 | Jaworski | A01M 1/04 362/253 |
| 6,493,986 B1 | * | 12/2002 | Nelson | A01M 1/145 43/113 |
| 6,560,919 B2 | | 5/2003 | Burrows et al. | |
| 6,886,292 B2 | | 5/2005 | Studer et al. | |
| 7,191,560 B2 | * | 3/2007 | Harris | A01M 1/02 43/107 |
| 7,611,253 B2 | * | 11/2009 | Chien | F21V 23/02 362/276 |
| 8,707,614 B2 | * | 4/2014 | Larsen | A01M 1/10 43/113 |
| 10,143,191 B2 | * | 12/2018 | Studer | A01M 1/145 |
| 10,264,776 B2 | * | 4/2019 | Borth | G01N 33/68 |
| 2009/0100743 A1 | * | 4/2009 | Prater | A01M 1/04 43/112 |
| 2015/0340826 A1 | * | 11/2015 | Chien | A61L 9/03 439/490 |
| 2018/0235202 A1 | * | 8/2018 | Sandford | A01M 1/02 |

FOREIGN PATENT DOCUMENTS

| | | | | |
|---|---|---|---|---|
| CN | 105766854 A | * | 7/2016 | |
| CN | 105850936 A | * | 8/2016 | |
| CN | 209359444 U | * | 9/2019 | ............. A01M 1/04 |
| ES | 2595111 A1 | * | 12/2016 | ............. A01M 1/02 |
| WO | WO-2020163364 A1 | * | 8/2020 | ............. A01M 1/10 |

* cited by examiner

*Primary Examiner* — Magdalena Topolski
(74) *Attorney, Agent, or Firm* — Boyle Fredrickson S.C.

(57) ABSTRACT

A wall outlet connectable insect trap for drawing in insects and trapping them within the trap is provided. The insect trap provides an aesthetically pleasing faceplate having a curved back with vented openings hidden from view such that insects may fly into the trap on a back end whereby sticky paper retaining the flies is also hidden from view.

19 Claims, 2 Drawing Sheets

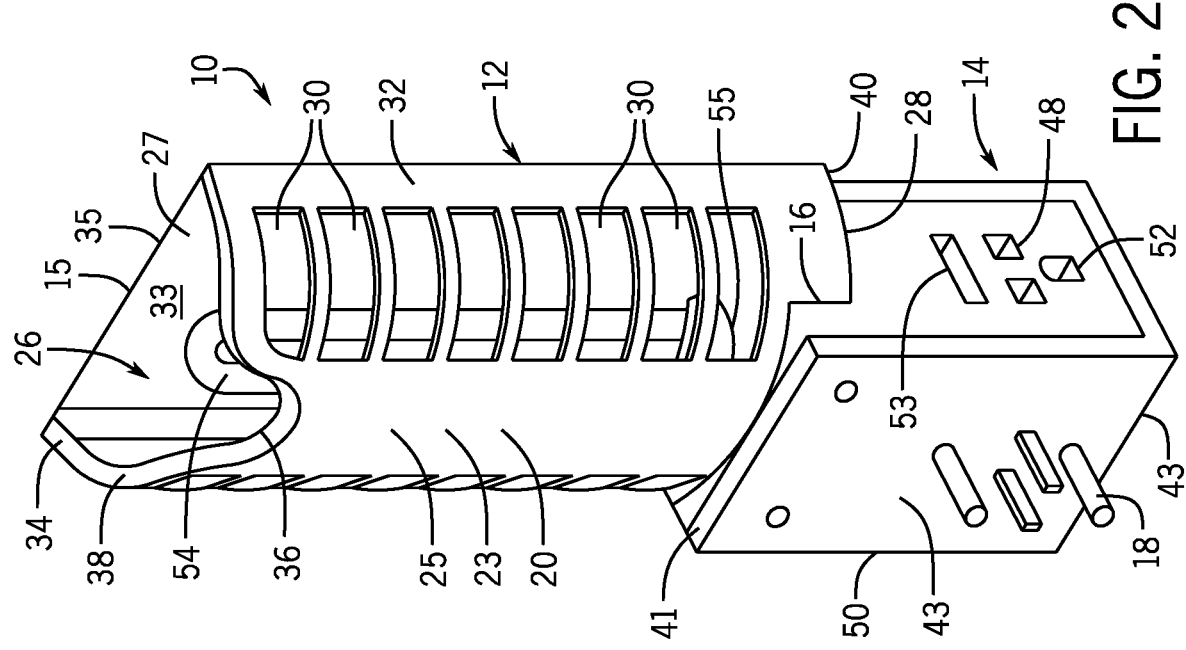
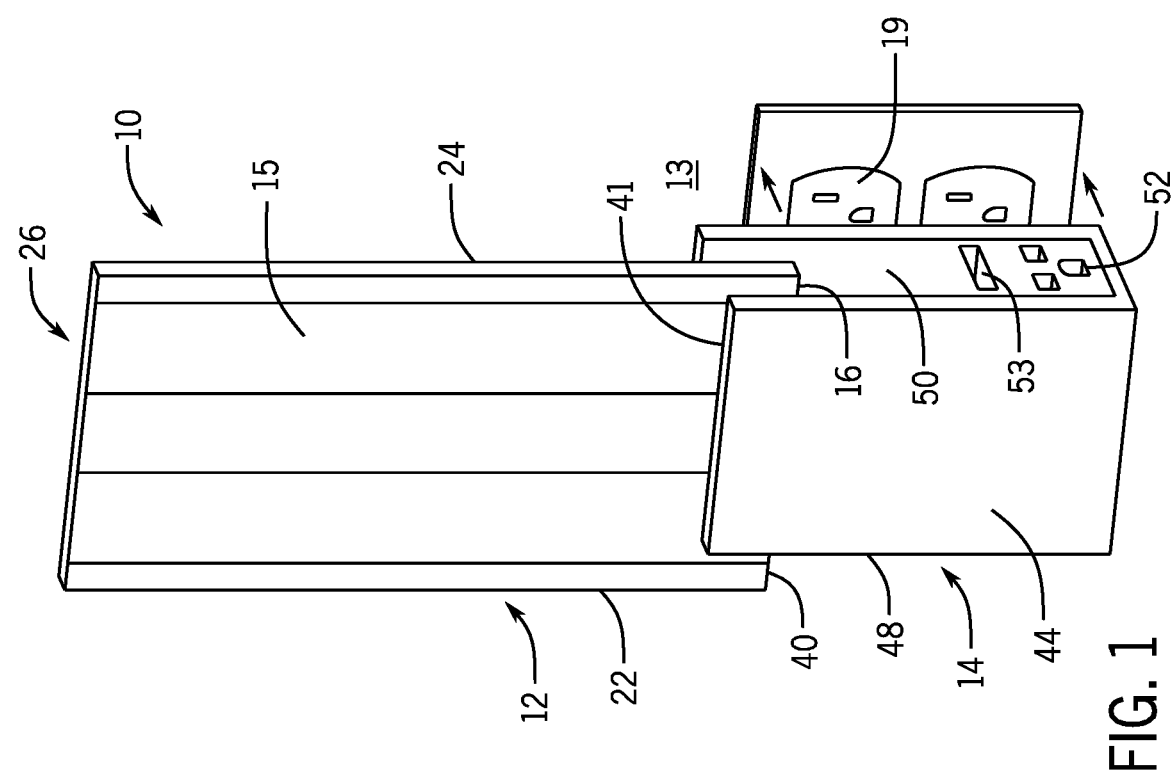

PLUG-IN INSECT TRAP

CROSS-REFERENCES TO RELATED APPLICATIONS

This application claims the benefit of U.S. design application Ser. No. 29/611,060 filed Jul. 18, 2017 and hereby incorporated by reference.

BACKGROUND OF THE INVENTION

This invention relates to the field of insect traps. More specifically, this invention relates to a wall outlet connectable insect trap that plugs into a wall outlet and uses ultraviolet light to attract insects to the trap. The insect trap provides an adhesive paper for restraining the insects to the adhesive paper once inside the insect trap housing.

There are many known attractants and lures for drawing insects to a trap. One commonly known attractant is light, such as ultraviolet light, which insects are drawn to and will gather around. Another attractant are chemical substances (natural or synthetic) that are detected by insects. The insects have a keen ability to detect scents in the chemicals, such as the smell of carbon dioxide (normally emitted by warm-blooded animals) or pheromones (produced by the insects themselves during mating), and are attracted to the scent of these chemicals.

Once the insects are drawn to the insect trap, a trapping mechanism is used to retain and/or kill the insects. One common trapping mechanism is sticky paper or fly paper which is coated with a sticky adhesive substance such that when the insects come into contact with the paper they are stuck to the adhesive substance and cannot escape. The adhesive substance may also contain a chemical attractant to lure insects into landing on the paper.

Another type of trapping mechanism is an electrical grid or mesh that is electrically charged and sends an electric charge through the insects when the insects land on the grid and bridge the gap between electrodes. The electric current flow through the insects' bodies will quickly stun or kill the insects.

Another type of trapping mechanism is one that captures the insects for later release, such as a one-way cage with a fan vacuum which sucks the insects into the cage but does not allow them to escape. An insect trap of this type is provided by U.S. Pat. No. 9,049,855 filed Nov. 19, 2012 entitled "Insect Trap Having an Air-Actuated Damper" and U.S. Pat. No. 9,326,497 filed Dec. 19, 2012 entitled "Solar Powered Insect Trap," assigned to the present applicant, both of which are hereby incorporated by reference. These insect traps may employ any of the attractant methods known in the art or described above, such as ultraviolet light and carbon monoxide, to lure insects into the one-way cage.

Many of these insect traps require an electric power source to power and operate the attractant, e.g., to power the light, electrical grid, or fan, that is used to lure and kill the insects.

The present invention seeks to provide an improved way to trap insects using a wall outlet connectable insect trap that draws insects toward an emitted light and traps them using sticky paper in an environmentally friendly and more aesthetically pleasing manner.

SUMMARY OF THE INVENTION

The present invention provides a wall outlet connectable insect trap for drawing in insects and trapping them within the trap. The insect trap provides an aesthetically pleasing faceplate having a curved vented back hidden from view such that insects fly into the trap on a back side of the enclosure. The vented back allows the sticky paper retaining the flies to be hidden from view.

One embodiment of the present invention provides a plug-in insect trap having a trap enclosure defined by a front facing plate coupled to a rear facing plate holding a plurality of vent openings, an electrical housing supporting the trap enclosure and having rear facing electrical connectors, an insect attractant positioned within the trap enclosure, and an insect catching device positioned within the trap enclosure, where insects may enter the trap enclosure through the rear vent openings.

It is thus a feature of at least one embodiment of the invention to obscure the insect catching device substantially from view so that the sight of captured insects is not easily seen.

The front facing plate may be substantially planar. The rear facing plate may be curved concave to the front facing plate.

It is thus a feature of at least one embodiment of the invention to allow the device to be plugged into a wall outlet while also allowing insects to enter the trap enclosure from a rear of the device that is not flush with the back wall. Contact of the trap enclosure with the back wall is minimized to prevent paint transfer.

The rear facing plate may be semi-transparent.

It is thus a feature of at least one embodiment of the invention to allow ultra violet light to emit from the trap housing in a manner that attracts insects but is directed away from a front of the trap.

The orientation of the front facing plate may be fixed with respect to the orientation of the rear facing electrical connectors.

It is thus a feature of at least one embodiment of the invention to keep the trap openings toward a rear of the trap when plugged into the wall so that the insect attractant and insect catching device are not easily seen.

The electrical housing may provide additional electrical sockets. The electrical housing may provide USB ports.

It is thus a feature of at least one embodiment of the invention to permit the insect trap to be plugged in without interfering with other uses of the electric outlets.

The trap enclosure and electrical housing may be separable.

It is thus a feature of at least one embodiment of the invention to keep the electrical components separated from the captured insects or debris.

The insect catching device may be a sticky substance. The sticky substance may include a chemical attractant. The insect catching device may be a sticky paper positioned along an inner surface of the front facing plate.

It is thus a feature of at least one embodiment of the invention to position the sticky paper where it is not easily seen from a front end of the insect trap while maximizing the surface area on which the insect may be captured.

The insect attractant may be an ultra violet lamp. The insect attractant may be a chemical attractant.

It is thus a feature of at least one embodiment of the invention to use known methods of insect attractants that utilizes the insect trap's electrical connection.

An alternative embodiment of the present invention provides a plug-in insect trap having a trap enclosure defined by a substantially planar front facing plate coupled to a substantially non-planar rear facing plate holding a plurality of vent openings, an electrical housing supporting the trap enclosure and having rear facing electrical connectors insertable into an electrical socket, an insect attractant positioned within an interior of the trap enclosure, and an insect catching device positioned within the interior of the trap enclosure, where insects may enter the interior of the trap enclosure through the vent openings and the vent openings are obscured from view when viewed from a front of the insect trap.

The insect catching device may be an adhesive paper. The adhesive paper may be obscured from view when viewed from the front.

An alternative embodiment of the present invention provides a method of trapping insects comprising the steps of providing a plug-in insect trap having a trap enclosure defined by a front facing plate coupled to a rear facing plate holding a plurality of vent openings, an electrical housing supporting the trap enclosure and having rear facing electrical connectors, an insect attractant positioned within the trap enclosure, and an insect catching device positioned within the trap enclosure, where insects may enter the trap enclosure through the vent openings; and plugging the electrical connectors into an electrical socket.

These particular objects and advantages may apply to only some embodiments falling within the claims and thus do not define the scope of the invention.

BRIEF DESCRIPTION OF THE VIEWS OF THE DRAWINGS

FIG. 1 is a front perspective view of a wall outlet insect trap having a forward-facing faceplate of an enclosure connected to an electrical housing according to the present invention;

FIG. 2 is a rear perspective view of the wall outlet insect trap of the present invention having a rear facing cage of the enclosure supported by the electrical housing.

DETAILED DESCRIPTION OF THE INVENTION

Figure 3:
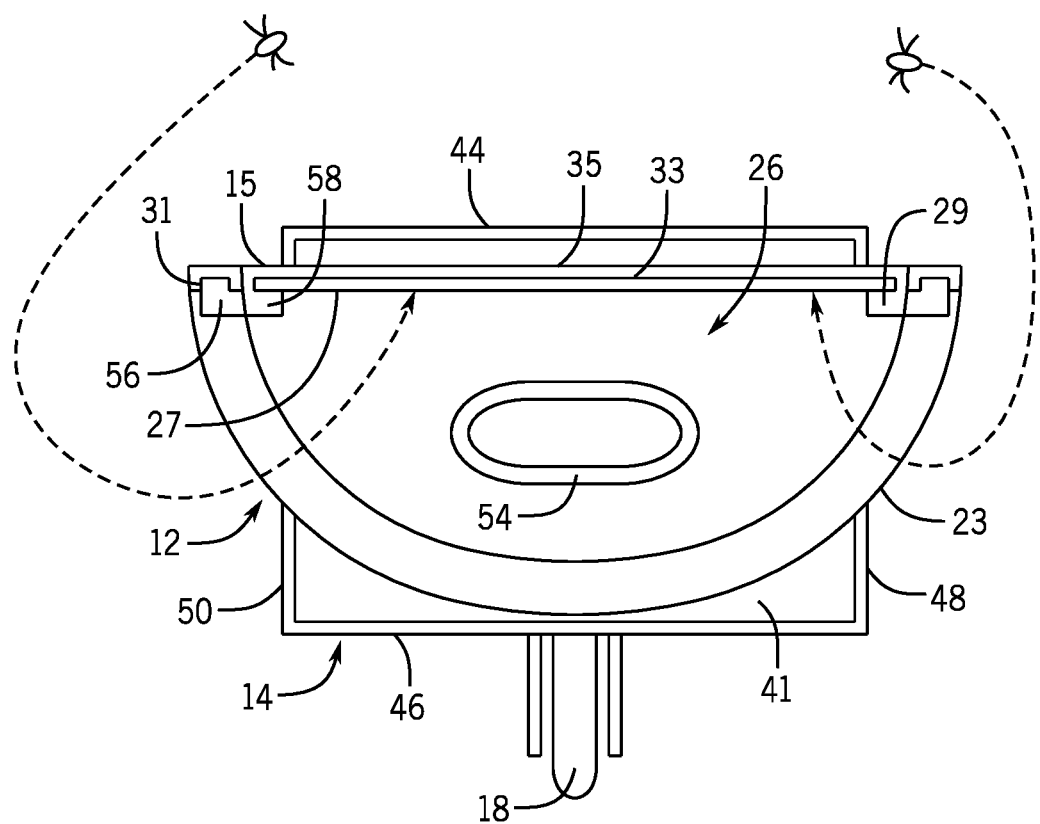
FIG. 3 is a top plan view of the enclosure having a curved cage allowing the entrance of insects into the enclosure and contacting sticky paper lining an inner surface of the faceplate.

Referring to FIGS. 1 and 2, a front and rear perspective view of an electrical outlet insect trap 10, respectively, according to the present invention is shown. The insect trap 10 provides an upper trap enclosure 12 supported by a lower electrical housing 14. The upper trap enclosure 12 having a generally semi cylindrical construction with a substantially planar front side and a curved backside. The lower electrical housing 14 has an upward groove 16 corresponding with the shape of the upper trap enclosure 12 and receiving the upper trap enclosure 12 therein. The lower electrical housing 14 has a generally rectangular construction with rearward protruding prongs 18 as further described below.

Referring specifically to FIG. 1, the upper trap enclosure 12 has a substantially planar faceplate 15 extending along a plane substantially parallel with a wall 13 receiving the insect trap 10 when the prongs 18 of the plug are coupled to an electrical outlet 19.

Referring specifically to FIG. 2, extending rearward from left 22 and right 24 edges of the faceplate 15 is a curved wall 20 providing a concave back side of the upper trap enclosure 12 providing a semi cylindrical cage with an open top end 26 and an enclosed lower end 28.

Referring now to FIGS. 2 and 3, the faceplate 15 and curved wall 23 may be two separate components coupled at the edges of each respective piece. The outer side edges of the faceplate 15 may have a T joint 29 having an outward extending first wing 56 and an inward extending second wing 58 forming the cross at the top of the T. The first wing 56 of the T joint 29 is inserted into an inner lip 31 at the edges of the curved wall 23 to retain the faceplate 15 to the curved wall 23.

An inner surface 33 of the faceplate 15 opposite the front outer surface 35 of the faceplate 15 supports a sheet of sticky paper 27. The second wing 58 of the T joint 29 provides a rail extending along a height of the faceplate 15 for retaining the sticky paper 27, inserted between the second wing 58 of the T joint 29 and the faceplate 15, to the inner surface 33 of the faceplate 15.

The sticky paper 27 may be a rectangular sheet of paper coated with an adhesive substance on one side which captures the insects. The sticky paper 27 may be impregnated with a fragrant chemical to lure insects or optionally a poisonous substance that kills insects that consume the substance. The sticky paper 27 may generally correspond with the size and shape of the faceplate 15 to maximize the trapping surface of the sticky paper 27. The substantially planar faceplate 15 assists in the attachment of the sticky paper 27 to the inner surface 33.

The curved wall 20 provides rectangular vented openings 30 along the left 32 and right 34 sides of the curved wall 23 that allow insects to pass into the interior of the upper trap enclosure 12. In one embodiment of the invention, a plurality of rectangular holes are provided along the left side 32 of the curved wall 23 and a plurality of rectangular holes are provided along the right side 34 of the curved wall 23. Each vented opening 30 may be an approximately 1½ inches wide by half an inch tall rectangle. A center area 25 of the curved wall 23 remains unvented. The center area 25 may be about 1½ inches wide.

The vented openings 30 may provide holes within at least one half of the surface area of the curved wall 23 or at least one third of the surface area of the curved wall 23. In this respect, insects may easily fly into the upper trap enclosure 12. It is understood that the vent openings 30 may be substantially rectangular in shape as shown but also made be provided in any shape or size that allow insects to pass through.

The curved wall 23 may also have an upper U-shaped cutout 36 along an upper edge 38 of the curved wall 23. The U-shaped cutout 36 assists the user to access the interior of the upper trap enclosure 12, for example, to replace the sticky paper 27 or lamp 54 which will be further described below.

The curved wall 23 may be constructed of a translucent or semi-translucent material allowing light to pass through the curved wall 23. The translucent or semi-translucent material may be colored to provide an aesthetic colored glow when light is shone through. For example, the translucent or semi-translucent material may be blue to provide a blue glow.

The faceplate 15 may be made of a plastic material or metal material that is generally opaque so that the sticky paper 27 cannot be seen from a front side of the insect trap 10. The material surface may also assist with the diffuse reflection of light in all directions to assist with spreading the light out.

The upper trap enclosure 12 may be about 6½ inches in height or about 5-8 inches in height. The faceplate 15 may be about 3½ inches in width or about 2-5 inches in width.

The distance between the left 32 and right 34 side of the curved wall 23 generally corresponds with the width of the faceplate 15.

The lower electrical housing 14 provides a rectangular volume having a top wall 41 and bottom wall 43, joined on its left and right side by left wall 48 and right wall 50, extending rearward from front wall 44 and backward from back wall 46 and carrying electrical components for electrical interconnection within the volume. A lower edge 40 of the faceplate 15 and curved wall 23 may be inserted into the groove 16 of the top wall 41 of the lower electrical housing 14. For example, the lower electrical housing 14 may have a straight line groove extending proximate the front wall 44 of the housing 14 and a curved groove extending proximate the back wall 46 of the housing 14 corresponding to the position of the walls 15, 23 of the upper trap enclosure 12 when coupled to the lower electrical housing 14.

The back wall 46 of the housing 14 may have rearward protruding prongs 18, extending perpendicular to the back wall 46, for insertion into corresponding sockets of an electrical outlet 19 of the wall 13. The prongs 18 may correspond to standard AC power plugs used in North America which are connected to primary alternating current power supply of a building and which may provide a lower voltage output for the lamp and/or direct current output. For example, the prongs 18 may correspond to a grounding type plug (3-prong) or non-grounding plug (2-prong). However, it is understood that the prongs 18 may conform to any power connector standard used around the world for different types of voltage and current rating, shape, size, and type of connector as understood in the art.

The left wall 48 and right wall 50 of the housing 14 may include additional electrical sockets 52 allowing other plugs to be used while the insect trap 10 is plugged into the wall 13. The left wall 48 and right wall 50 of the housing 14 may also include USB ports 53 allowing a corresponding USB plug to be used while the insect trap 10 is plugged in, for example, to charge other computers or electronic devices. It is understood that the housing 14 may carry any type of socket or port for connection of electrically powered devices and any combination of additional sockets and ports.

The top wall 41 of the electrical housing 14 may include a lightbulb socket 55 providing electrical connectors to receive a lamp 54 and support it in the electrical housing 14. The lightbulb socket 55 may be substantially centered within the top wall 41 such that the lamp 54 is substantially centered within the upper trap enclosure 12. In this manner, the lamp 54 does not contact the sticky paper 27 or the curved wall 23. The lightbulb socket 55 may be an Edison screw base, bayonet style mount, bi-post, bi-pin connector, or wedge base. Once the lamp 54 is coupled to the electrical connectors of the lower electrical housing 14, electrical power is delivered to the lamp 54 when the insect trap 10 is connected to mains electricity.

The lamp 54 may be, for example, an ultraviolet tube lamp or ultraviolet fluorescent tube lamp. The lamp 54 may emit both visible and ultraviolet light which is visible to insects and attracts them to the light.

Referring to FIGS. 1-3, in operation, the prongs 18 of the electrical housing 14 are plugged into an electrical outlet 19 of a wall 13. When the insect trap 10 is plugged into the wall 13, mains electricity is delivered to the electrical components of the electrical housing to light the lamp 54 and deliver power to any of the additional electrical sockets 52 or USB ports 53.

When the insect trap 10 is plugged into the wall 13, the faceplate 15 of the upper trap enclosure 12 faces away from the wall 13 and the curved wall 23 faces inward toward the wall 13. The front of the faceplate 15 is substantially parallel with the wall 13.

When the lamp 54 is lit, which may occur automatically when the insect trap 10 is plugged into the wall 13, manually when switched on by the user, or pre-programmed by the insect trap 10, the light from the lamp 54 exits the curved wall 23 through the open top end 26, vented openings 30, and through the semi-translucent curved wall 23. The light reflects off the back wall 13 to produce a "halo effect" that attracts insects to the trap. The light may also be used as a night light or sconce.

The insect trap 10 may optionally also include a chemical attractant to further attract insects to the trap 10. The chemical attractant may be incorporated into the sticky paper 27 or may be separate from the sticky paper 27.

Once insects are drawn to the insect trap 10 the insects fly into the vent openings 30 within the curved wall 23 or through the open top end 26 of the upper trap enclosure 12. Once inside the upper trap enclosure 12, the insects that land on the sticky paper 27 get trapped to the sticky paper 27.

Once the sticky paper 27 is filled with insects, the sticky paper 27 may be replaced by sliding the sticky paper upward along the rail formed by the second wing 58 of the T joint 29 so that the sticky paper 27 is removed from the upper trap enclosure 12. A new sticky paper 27 may be replaced by sliding the sticky paper 27 downward along the rail formed by the second wing 58 of the T joint 29 holding the outer edges of the sticky paper 27 to the faceplate 15.

The insect trap 10 provides a discreet trapping method that hides the vent openings 30 and sticky paper 27 from view so that the trapped insects are not easily seen and oriented away from the user's view. The light is still emitted in a manner which allows the glow from the trap to attract insects without any forward oriented openings.

In an alternative embodiment of the invention, the upper trap enclosure 12 may alternatively or additionally contain a different insect catching device in the form of a grid or mesh of wires that are electrically charged to a voltage, for example, between 500 and 1500 volts (V) of direct current. When the electrically conductive body of an insect bridges the gap between electrodes, a charge flows through the insect stunning or killing the insect. The insects may be retained by the enclosed lower end 28 of the upper trap enclosure 12.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A plug-in insect trap comprising:
a trap enclosure providing an enclosure volume between a front facing plate coupled to a rear facing plate, the latter including a plurality of vent openings;
an electrical housing supporting the trap enclosure and having rear facing electrical connectors insertable into an electrical socket of a rear wall;
an insect attractant comprising a light source positioned within the trap enclosure; and
an insect catching device positioned within the trap enclosure;
wherein insects may enter the trap enclosure through the vent openings;
wherein the plurality of vent openings are adapted to provide an uninterrupted straight line path of light from the light source to lateral areas of the rear wall flanking the electrical socket behind the trap enclosure;
wherein the plurality of vent openings extend along left and right sides of the trap enclosure to provide a straight line path into the vent openings of the left side, through the enclosure volume, and out the vent openings of the right side.

2. The insect trap of claim 1, wherein the rear facing plate is curved in a concave manner with respect to the front facing plate.

3. The insect trap of claim 2, wherein the front facing plate is substantially planar.

4. The insect trap of claim 2, wherein the rear facing plate is semi-transparent.

5. The insect trap of claim 2, wherein an orientation of the front facing plate is fixed with respect to an orientation of the rear facing electrical connectors.

6. The insect trap of claim 1, wherein the electrical housing further comprises electrical sockets.

7. The insect trap of claim 6, wherein the electrical housing further comprises USB ports.

8. The insect trap of claim 1, wherein the trap enclosure and electrical housing are separable.

9. The insect trap of claim 1, wherein the insect catching device is an adhesive substance.

10. The insect trap of claim 9, wherein the adhesive substance includes a chemical attractant.

11. The insect trap of claim 9, wherein the insect catching device is a sticky paper positioned along an inner surface of the front facing plate.

12. The insect trap of claim 1, wherein the light source is an ultra violet lamp.

13. The insect trap of claim 12, wherein the insect attractant further comprises a chemical attractant.

14. A plug-in insect trap comprising:
a trap enclosure providing an enclosure volume between a front facing plate coupled to a substantially non-planar rear facing plate, the latter including a plurality of vent openings;
an electrical housing supporting the trap enclosure and having rear facing electrical connectors insertable into an electrical socket;
an insect attractant comprises a light source positioned within an interior of the trap enclosure; and
an insect catching device positioned within the interior of the trap enclosure;
wherein insects may enter the interior of the trap enclosure through the vent openings and the vent openings are obscured from view when viewed from a front of the insect trap;
wherein the plurality of vent openings are adapted to provide an uninterrupted straight line path of light from the light source to lateral areas of the rear wall flanking the electrical socket behind the trap enclosure;
wherein the plurality of vent openings extend along left and right sides of the trap enclosure to provide a straight line path into the vent openings of the left side, through the enclosure volume, and out the vent openings of the right side.

15. The plug-in insect trap of claim 14, wherein the insect catching device is an adhesive paper.

16. The plug-in insect trap of claim 15, wherein the adhesive paper is obscured from view when viewed from a front end of the trap.

17. A method of trapping insects comprising the steps of:
providing a plug-in insect trap comprising:
a trap enclosure providing an enclosure volume between a front facing plate coupled to a rear facing plate, the latter including a plurality of vent openings;
an electrical housing supporting the trap enclosure and having rear facing electrical connectors;
an insect attractant comprises a light source positioned within the trap enclosure; and
an insect catching device positioned within the trap enclosure;
wherein insects may enter the trap enclosure through the vent openings;
plugging the electrical connectors into an electrical socket;
wherein the plurality of vent openings are adapted to provide an uninterrupted straight line path of light from the light source to lateral areas of the rear wall flanking the electrical socket behind the trap enclosure;
wherein the plurality of vent openings extend along left and right sides of the trap enclosure to provide a straight line path into the vent openings of the left side, through the enclosure volume, and out the vent openings of the right side.

18. The method of claim 17, wherein the front facing plate is substantially planar and the rear facing plate is substantially non-planar.

19. The method of claim 17, wherein the insect catching device is obscured from view when viewed from a front end of the trap.

* * * * *